US010146697B1

United States Patent
Duggal et al.

(10) Patent No.: US 10,146,697 B1
(45) Date of Patent: Dec. 4, 2018

(54) NUMA-AWARE PERFECT HASH ALGORITHM

(71) Applicant: EMC IP Holding Company LLC, Hopkinton, MA (US)

(72) Inventors: Abhinav Duggal, Santa Clara, CA (US); Tony Wong, Milpitas, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 15/389,437

(22) Filed: Dec. 22, 2016

Related U.S. Application Data

(60) Provisional application No. 62/399,685, filed on Sep. 26, 2016.

(51) Int. Cl.
| | |
|---|---|
| *G06F 3/06* | (2006.01) |
| *G06F 12/02* | (2006.01) |
| *G06F 12/1018* | (2016.01) |

(52) U.S. Cl.
CPC .......... *G06F 12/1018* (2013.01); *G06F 3/065* (2013.01); *G06F 3/067* (2013.01); *G06F 3/0608* (2013.01); *G06F 3/0619* (2013.01); *G06F 3/0641* (2013.01); *G06F 12/0253* (2013.01)

(58) Field of Classification Search
CPC .. G06F 12/1018; G06F 6/0253; G06F 3/0608; G06F 3/0619; G06F 3/0641; G06F 3/065; G06F 3/067; G06F 2212/702
USPC ........................................................ 711/162
See application file for complete search history.

(56) References Cited

U.S. PATENT DOCUMENTS

| | | | | |
|---|---|---|---|---|
| 9,189,414 B1* | 11/2015 | Shim | ....................... | G06F 12/08 |
| 9,317,218 B1* | 4/2016 | Botelho | ................ | G06F 3/0655 |
| 9,430,164 B1* | 8/2016 | Botelho | ................ | G06F 3/0655 |
| 2008/0275847 A1* | 11/2008 | Chellapilla | ....... | G06F 17/30949 |
| 2013/0097380 A1* | 4/2013 | Colgrove | .......... | G06F 17/30159 711/118 |
| 2014/0181575 A1* | 6/2014 | Kalach | ................ | G06F 11/1415 714/6.11 |
| 2015/0120754 A1* | 4/2015 | Chase | ................. | G06F 17/3033 707/747 |
| 2015/0169467 A1* | 6/2015 | Chase | ................. | G06F 12/1018 711/216 |
| 2017/0364517 A1* | 12/2017 | Kafai | ....................... | H04L 9/00 |

OTHER PUBLICATIONS

Fabiano C. Botelho, Rasmus Pagh, Nivio Ziviani, Practical perfect hashing in nearly optimal space Inf. Syst., 38 (1) (2013), pp. 108-131 (Year: 2013).*

\* cited by examiner

*Primary Examiner* — Mano Padmanabhan
*Assistant Examiner* — William E. Baughman
(74) *Attorney, Agent, or Firm* — Staniford Tomita LLP

(57) ABSTRACT

Embodiments are directed to perfect physical garbage collection (PPGC) process that uses a NUMA-aware perfect hash vector. The process splits a perfect hash vector (PHVEC) into a number of perfect hash vectors, wherein the number corresponds to a number of nodes having a processing core and associated local memory, directs each perfect hash to a respective local memory of a node so that each perfect hash vector accesses only a local memory, and assigns fingerprints in the perfect hash vector to a respective node using a mask function. The process also performs a simultaneous creation of perfect hash vectors in a multi-threaded manner by scanning the Index once.

20 Claims, 6 Drawing Sheets

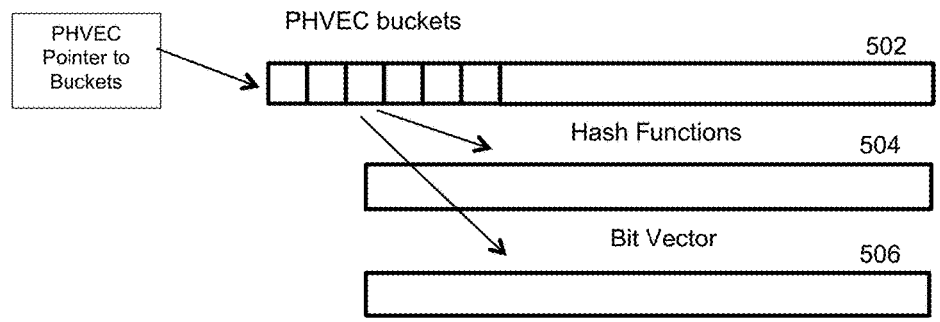
FIG. 5
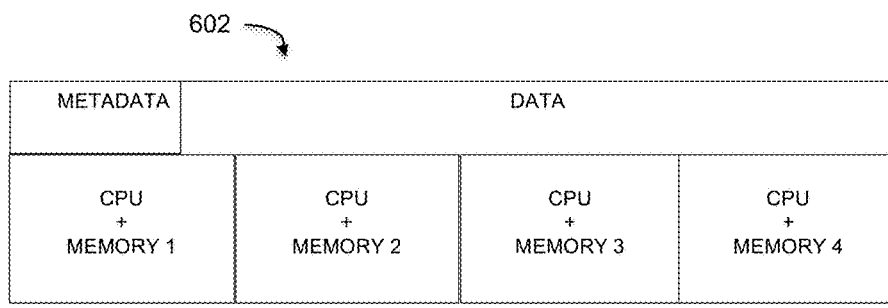
FIG. 6A
FIG. 6B

NUMA-AWARE PERFECT HASH ALGORITHM

CROSS-REFERENCE TO RELATED APPLICATIONS

The present application claims the benefit of the U.S. Provisional Application No. 62/399,685 entitled "Efficient Physical Garbage Collection" and filed on Sep. 26, 2016.

TECHNICAL FIELD

This invention relates generally to maintaining stored data and performing memory lookups, and more particularly to Non-Uniform Memory Access (NUMA)-aware perfect hash algorithms.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

A perfect hash function is generally known to be a hash function that maps distinct elements in a set S to a set of integers with no collisions, where a collision is defined as two different inputs producing the same hash value or fingerprint output. A perfect hash vector (PHVEC) based on a perfect hash function is a very memory efficient data structure that can provide a mapping from a set of known keys into a unique vector position. In certain garbage collection processes, perfect hash vectors are used to track the liveness of data segments. Compared to other structures, perfect hash vectors are efficient. For example, a simple PHVEC that provides two states (live or dead) per key requires only 2.8 bit for each key, whereas a Bloom filter performing the same function will require at least six bits per key and will still produce on the order of about 5 to 10% collisions.

Despite having a small memory footprint, perfect hash vectors do have certain costs. For example, in a known backup file system (e.g., EMC Data Domain file system), it may take up to four random memory accesses for each PHVEC operation, as compared to just one access in the case of a block Bloom filter implementation. Second, it can take several hours to enumerate all the keys in the file system in order to create the PHVEC. Furthermore, all of the keys must be known and kept in memory for the PHVEC creation. In physical garbage collection system implementations, a PHVEC may be used to track the liveness of the LP (metadata) segments only. In newer garbage collection systems (such as perfect physical garbage collection, PPGC) systems, PHVEC may used to implement both the LP vector and the live vector, which can be up to hundreds or thousands of times larger than the LP vector. New techniques are thus needed to optimize both the creation and all the PHVEC operations including insertion, lookup and deletion.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 5 illustrates a PHVEC data structure under some embodiments.

FIG. 6A illustrates a correspondence between a perfect hash vector and four different CPU/Memory units, under an embodiment.

FIG. 6B illustrates the splitting of the PHVEC into separately assigned vectors, under an embodiment.

DETAILED DESCRIPTION

Figure 1:
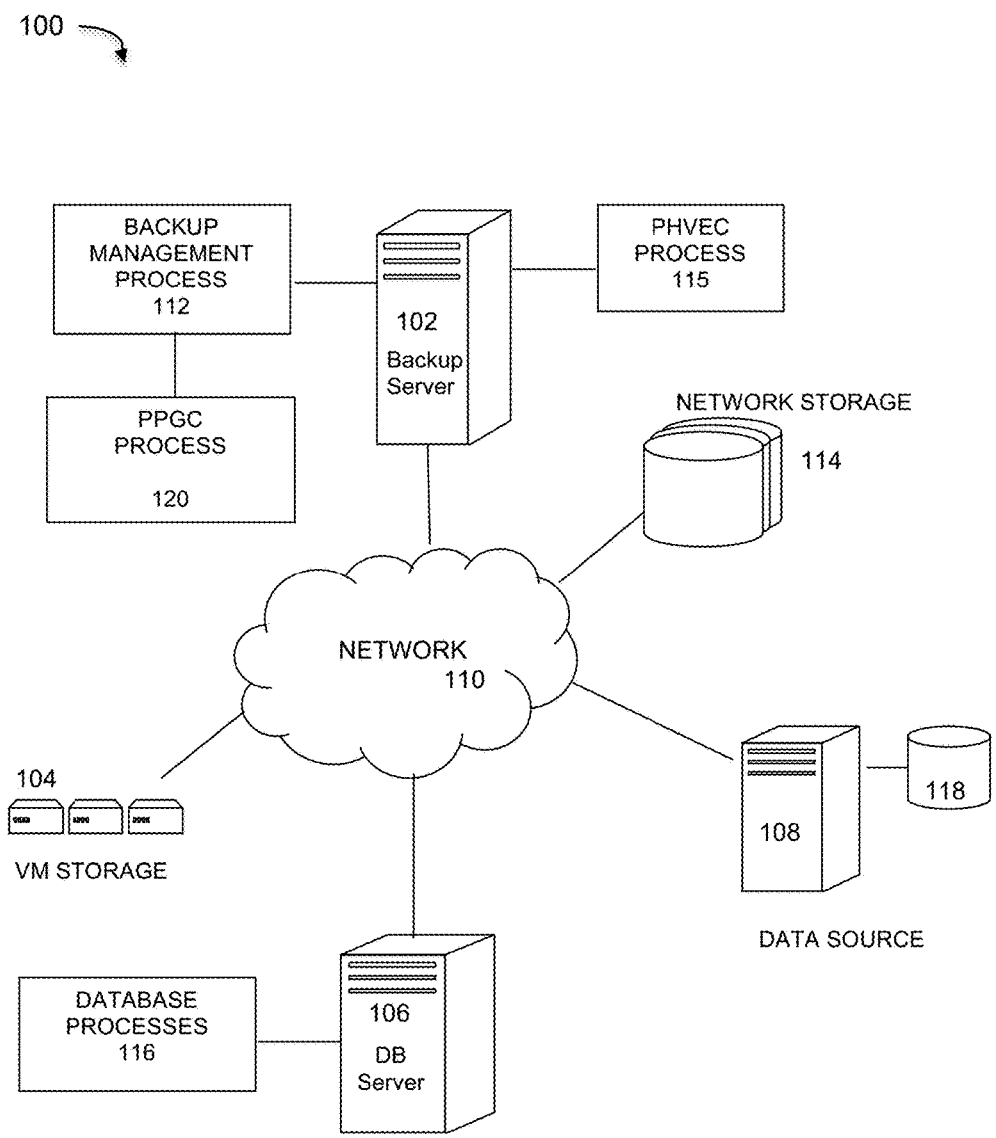
FIG. 1 is a diagram of a large-scale network implementing a NUMA-aware perfect hash vector for certain applications like garbage collection, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a NUMA-aware perfect hashing process that improves physical garbage collection systems allowing the perfect hash vectors to align to respective nodes. FIG. 1 illustrates a computer network system that implements one or more embodiments of a large-scale network implementing an efficient or "perfect" physical garbage collection process, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) representing a physical or virtual network of many virtual machines. The VMs or other network storage devices serve as target storage devices for data backed up from one or more data sources, such as computer 108, which may have attached local storage 118 or utilize networked accessed storage devices 114.

The network server computers are coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage 114.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. A separate computer 106 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

In an embodiment, computer system 100 implements non-uniform memory access architecture (NUMA) for at least part of its memory design. NUMA is used in multi-processing systems where the memory access time depends on the memory location relative to the processor. Under NUMA, a processor can access its own local memory faster than remote (non-local) memory, which is memory local to another processor or memory shared between processors. NUMA provides benefits that are usually limited to particular workloads, such as on servers where the data are often associated strongly with certain tasks or users. Without NUMA, multiprocessor system can starve several processors at the same time because only one processor can access the computer's memory at a time. NUMA provides separate memory for each processor thus increasing performance when several processors attempt to address the same memory.

In an embodiment, the NUMA architecture is used to optimize the multi-threaded processes of deduplication backup process 112. For the embodiment of FIG. 1, server 102 also executes a perfect hash vector process 115 to create and process perfect hash vectors in some aspects of the server processes including backup management 112 and one or more garbage collection, physical garbage collection (PGC) or perfect physical garbage collection (PPGC) processes 120.

Figure 2:
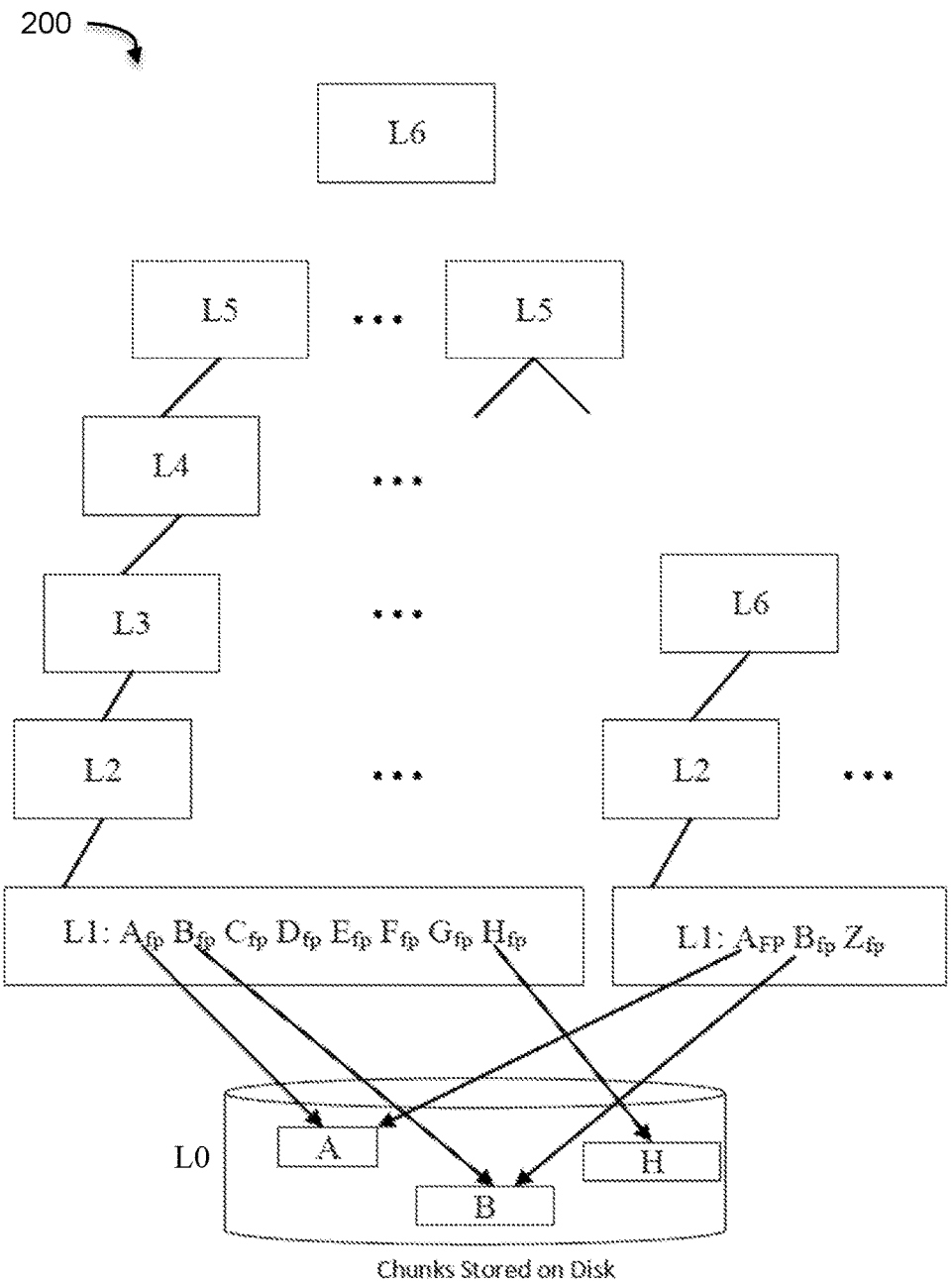
FIG. 2 shows a typical file tree representation in deduplicated storage.

FIG. 2 shows a typical file tree representation 200 in deduplicated storage. The chunks directly written by users are represented as L0, meaning the lowest level of the tree. Consecutive L0 chunks are referenced with an array of fingerprints by an L1 chunk, and an array of L1 fingerprints are referenced by an L2 chunk. This continues up to the top of the tree that we always label L6 for consistency, even if the file is small enough not to need intermediate nodes such as the example on the right side of the figure. The L1-L6 chunks are referred to as LP chunks, where P is a parameter that ranges from 1 to 6 and indicates metadata representing the file. Representing a file in a tree structure of fingerprints covering the lower layers of the tree is often called a Merkle tree. Deduplication takes place because a chunk can be referenced multiple times such as chunks A and B in the example. Though not shown in FIG. 2, LP chunks are themselves stored on disk in containers.

As an example, consider a system with 100 TB of capacity, 10 times deduplication ratio (logical capacity divided by physical capacity), 8 KB L0 chunks, and 20-byte fingerprints. The logical capacity is 1 PB, and since each 8 KB logically written by a client requires a 20-byte fingerprint stored in an L1, the L1 chunks are 2.5 TB, though the upper levels of the tree are smaller. This example highlights that the mark phase cannot be fully performed in memory, as the L1 references should be read from disk. In an embodiment, the system 100 container format includes a metadata section with a list of fingerprints for the chunks within the container. The metadata region is relatively small (a few hundred KB) and can be read more quickly than the full container With reference to FIG. 2, the L0 segments represent user data and are the leaves of the tree. The L6 is the root of the segment tree. Segments from L1 to L6 are referred to as metadata segments or LP segments. They represent the metadata of a file associated with a file tree. An L1 segment is an array of L0 references. Similarly an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory. The GC process of the file system is responsible for enumerating all live segments in the live content handles of the file system. In a conventional logical enumeration algorithm, which is a depth-first traversal of all the file trees, each file tree is entirely traversed within a single context so that it is possible to roll a checksum from the L0 segments toward the root of the tree and validate the checksum every time a file tree is traversed. In a physical garbage collection process, the enumeration algorithm carries out a breadth-first traversal of all the files in the file system. Thus, the file tree is not used as it does a level-by-level scan of all the trees simultaneously. Hence it cannot roll a per-file-tree checksum that would allow the garbage collector to identify whether any metadata segment is missed which could lead to problems of corruption states in the file system.

Perfect Hash Function

Figure 3:
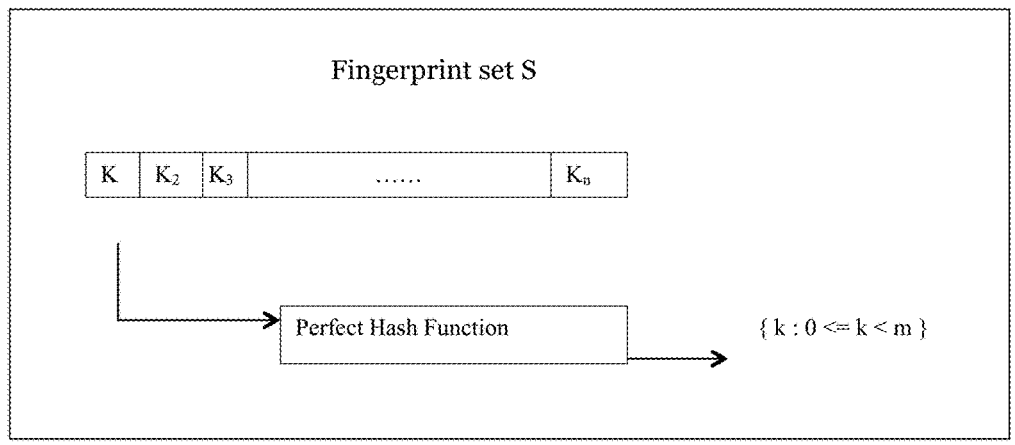
FIG. 3 illustrates a perfect hash function for a fingerprint set that can be used in conjunction with certain embodiments.

FIG. 3 illustrates a perfect hash function for a fingerprint set that can be used in conjunction with certain embodiments. The perfect hash function phf( ) has the following representation:

$$\text{phf}(x) = (f(x) + a_{i(x)} h(x) + b_{i(x)}) \% \ m$$

$$i(x) = g(x) \% \ r$$

where f, g, h are uniform hash functions; r is the number of hash buckets in the perfect hash function and a, b are constants that depend on the bucket. The size of the function can be written as:

$$|PH_{vec}| = |PHF| + |Bit\ vector|$$

where |PHF| is the space required to store the per bucket constants.

Figure 4:
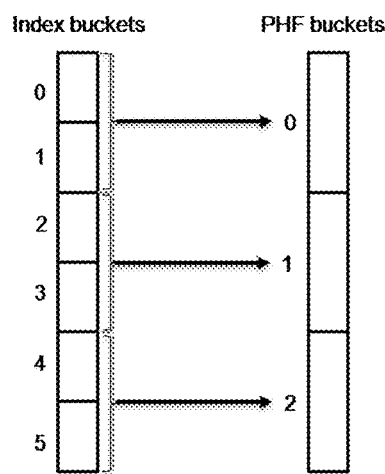
FIG. 4 illustrates a correlation of index buckets to PHF buckets, under an embodiment.

The index is further subdivided into multiple partitions such that all the fingerprints in each partition can fit in memory in order to build the perfect hash function for that subset of fingerprints. FIG. 4 illustrates a correlation of index buckets to PHF buckets, under an embodiment.

NUMA-Aware Perfect Hash Vector

A PHVEC based on a perfect hash function is a data structure that provides a mapping from a set of known keys into a unique vector position. Depending on the number of keys, a PHVEC is internally divided into smaller buckets. The probability of successful creation of the hash functions can get smaller and smaller as the number of keys in each bucket gets larger. For example, in a Data Domain file system implementation, the average bucket size is kept under 16K. FIG. 5 illustrates a PHVEC data structure under some embodiments. As shown in FIG. 5, the PHVEC 502 comprises a number of buckets pointed to by pointers, and each bucket invokes a hash function 504 and a bit vector 506.

In an embodiment, the perfect hash vector requires four random memory lookups. Thus, as shown in FIG. 5, to access each bit in the bit vector 506, there would be four random memory accesses. In a NUMA system, a memory lookup to remote memory results in high latency due to the difference between local and remote memory lookups. FIG. 6A illustrates a correspondence between a perfect hash vector and four different NUMA memory units (nodes or sockets), under an embodiment. As shown in FIG. 6A, a perfect hash vector 602 comprises a metadata section and a data section that is a large data structure occupying a great deal of memory. For the example of FIG. 6A, PHVEC 602 is spread across four CPU plus memory units 604, denoted as units or nodes 1-4. Based on the fingerprint, the process will perform a lookup in the vector, but the position within the vector is random, so the chance that the lookup will access local memory is one out of four. Based on simple probability, the chance that a lookup will go to remote memory for the example of FIG. 6A is three out of four times; thus on average 75% of the FP lookups will be remote memory accesses within the NUMA system.

For deduplication backup systems, this latency due to the difference between local and remote memory accesses, such as in an enumeration phase of garbage collection could result in hours or even days of memory access time. One example difference may be 100 ns for a local access and 200 ns for a remote memory access, for a difference of 100 ns or twice the time of the local memory access time. This difference adds up quickly in highly repetitive backup operations where there is a lot of deduplication. To alleviate this problem, embodiments of the PHVEC process 115 improves the perfect hashing to reduce the latency of memory accesses. This is accomplished by the following techniques:
1. splitting the perfect hash vector into four perfect hash vectors, or any appropriate number N vectors, based on the number of nodes
2. directing each perfect hash to a respective local memory so that each perfect hash goes to a local node,
3. deterministically assign fingerprints to nodes.

FIG. 6B illustrates the splitting of the PHVEC into separately assigned vectors, under an embodiment. As shown in FIG. 6B, the PHVEC 602 is divided into four parts denoted PHVEC 1 to PHVEC 4, and each PHVEC is assigned to a respective NUMA node. For this embodiment, fingerprints are partitioned according to the number of NUMA nodes N. Each fingerprint FP is mapped to the NUMA node using the following formula:

node=(FP mod N).

A simple PHVEC is created on each NUMA node, as shown in FIG. 6B, and all its data structures "live" in that NUMA node; that is, all the memory for that perfect hash vector is allocated from that NUMA node. The PHVEC operations can then be grouped by the NUMA node number and processed by threads that run on the same NUMA node. All the memory access will then be local to that NUMA node. For example, during the enumeration phase, fingerprints are read from the LP segments and they are grouped by the node number and then inserted to the live vector by threads running on the same node. An appropriate mechanism will ensure that accesses from a particular PHVEC will not go to a remote node.

With respect to the deterministic assignment of fingerprints to a particular vector, and hence to a node, in one embodiment, a mapping scheme is used based on the last two bits of an index (i.e., 00, 01, 10, 11). The index is created by walking the walk index and this creates a mask that is combined with the fingerprint. This redirection can be expressed as:

mapping=FP+mask.

In the example case of four PHVEC and nodes, the mapping can be as follows:
 FP+00 to Node 1,
 FP+01 to Node 2,
 FP+10 to Node 3,
 FP+11 to Node 4.

PHVEC Creation

As shown in FIG. 6B, the PHVEC is internally subdivided into many smaller PHVEC's. Fingerprints are hashed into these vectors uniformly. This subdivision is necessary to keep the maximum number of fingerprints for each vector to some desirable constant to achieve a high probability of success in the PHVEC creation process, and also keep the memory requirement in check as all the fingerprints have to be kept in memory during the creation process. As used above, to simplify the terminology, the internal PHVEC's are called buckets. It is required that all fingerprints for the same PHVEC bucket are available before the creation can occur.

In an embodiment, the PHVEC process 115 creates the perfect hash vectors using either a single-threaded process or a multi-threaded process. For single-threaded PHVEC creation fingerprints from a number (b) of index buckets are hashed into one perfect hash bucket, where b is defined as the stride. To calculate the stride, the process first calculates the total number of perfect hash buckets by the total number of fingerprints in the index divided by each perfect hash bucket size i.e., 16K. It then divides the total number of index buckets by this total number of perfect hash buckets. For example, if there are 16 billion fingerprints in the index, with a 16K perfect hash vector bucket size, there perfect hash vector bucket count is 1 million. If there are 16 million Index buckets, then the stride is 16 million/1 million=16.

Figure 7:
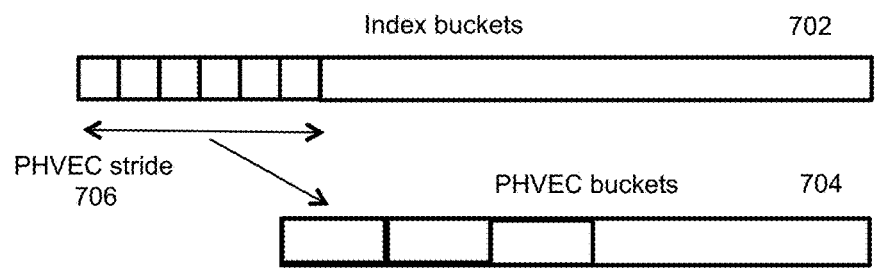
FIG. 7 illustrates the relationship between index buckets and PHVEC buckets using a PHVEC stride, under an example embodiment.

The index is read one stride at a time and all the fingerprints are sent to the PHVEC for creation. FIG. 7 illustrates the relationship between index buckets and PHVEC buckets using a PHVEC stride, under an example embodiment. As shown in FIG. 7, a number of index buckets 702 define a PHVEC stride 706 that corresponds to a single PHVEC bucket 704.

Figure 8:
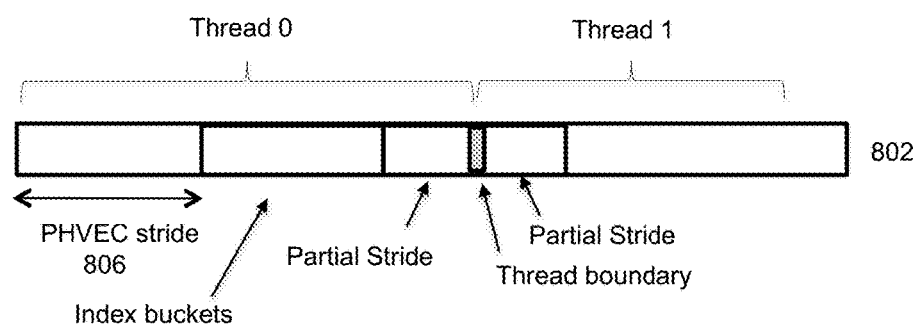
FIG. 8 illustrates a multi-threaded PHVEC creation process with partial strides, under an example embodiment.

This can be adapted to multi-threaded creation by subdividing the index buckets in stride size units, except the last set of buckets because the last set of buckets might not be a multiple of the stride. Each thread will create the PHVEC buckets independently. However, this simple approach does not work when creating more than one perfect hash vector at the same time (e.g., one walk vector and one Live Vector), as the stride sizes will not be the same. The Live Vector stride will be much smaller than the walk vector stride because Live Vector has to create perfect hash functions for all fingerprints whereas the walk vector has to create perfect hash functions only for LPs or metadata. One way can be to do one index scan to create perfect hash functions for LPs, and another way is to create perfect hash functions for all fingerprints. This approach, however, would result in two index scans, and since the index is on disk, it can take several hours to read it twice from disk. The creation algorithm is thus adapted to handle strides that can cross thread boundary. In multi-threaded PHVEC creation, each thread can have a maximum of two partial strides, one at each end of the boundary, and in the degenerate case, there can be just one such partial stride. FIG. 8 illustrates a multi-threaded PHVEC creation process with partial strides, under an example embodiment. As shown in FIG. 8, for index buckets 802, the PHVEC stride 806 is defined as the length of a individual bucket. In a multi-threaded case, multiple threads 0 to n are used to process the buckets, and the thread boundaries may not always match the stride boundaries. Thus, as shown in FIG. 8 both thread #0 and #1 owns a partial stride as the thread boundary resides within a single stride. In this case, the PHVEC bucket cannot be created unless all the data in the two partial strides are combined together. In an embodiment, the PHVEC process 115 processes the full strides using the multi-threaded execution and the partial strides using single-threaded execution and then combines the two together. Thus, buckets from the index are subdivided evenly to the PHVEC creation threads. These threads will issue PHVEC bucket creation for the complete strides. Each thread will keep track of the partial strides by the stride number b/S. The corresponding PHVEC buckets will not be created until all the complete strides have been processed. Then the partial strides are combined together based on the stride number and the PHVEC bucket created using one single thread. This algorithm can be applied to more than one PHVEC simultaneously.

In an embodiment, certain optimization techniques can be used to make the PHVEC processing more efficient and/or faster. For example, one technique is to reduce the number of random memory accesses by combining pairs of accessing into a single cache line. Thus, for the example of four memory accesses, this could be reduced to three accesses by combining the third and fourth accesses into a single access.

Another optimization technique is to perform batched PHVEC operations with prefetch. For this embodiment, fingerprints are grouped by the NUMA node number and then processed as a large batch by threads on the same NUMA node; and all memory access is local. In addition to this optimization, the following prefetching algorithm can further reduce the memory latency: (1) let the number of operations be N, and (2) define each memory access $M_i$ where i=0, 1, 2, . . . m. If these memory accesses are independent, the prefetch algorithm is straightforward. In the perfect hash vector implementation, each memory access depends on the previous one, i.e., the memory location of $M_i$ depends on the contents of $M_{(i-1)}$. If the result of $M_{(i-1)}$ is not ready yet, the memory content will have to be fetched from memory instead of the cache lines.

For this algorithm, define $M_i[j]$ to be the i-th memory access for fingerprint j, and define $S_i$ to be the stride size for each memory access. At the k-th step of the perfect hash vector operation, the prefetch should have been performed up to $M_i[k+Si]$. Because of the memory dependency, the following inequalities should hold:

$$S_0 > S_1 > \ldots > S_m$$

To perform the prefetch at $M_i[k+Si]$, the result of $M_{(i-1)}[k+Si]$ should have been in the cache. Since $S_{(i-1)} > S_i$, prefetch of $M_{(i-1)}$ has already been done at the $(k-(S_{(i-1)}-S_i))$-th step.

Next, define $p_i$ to be the current number of prefetches already performed for $M_i$. The prefetch algorithm can be formalized as follows:
1. Prefetch initialization:
   For i in 0, 1, 2, . . . m
     Perform prefetch of $M_i[j]$ for j=0 to $(S_i-1)$
     Set current index $p_i$ to $S_i$ 2. Main loop:
   For fingerprint j, j=0, 1, 2, . . . , n
     For i in 0, 1, 2, . . . , m
     Perform prefetch of $M_i[p_i]$ if $p_i < n$, update $p_i$
     Compute the vector position for fingerprint j from the memory chain $M_0[j] \rightarrow M_1[j] \ldots \rightarrow M_m[j]$ all of which should be in cache memory.

The prefetch technique can dramatically improve the performance of the PHVEC processing. In one example implementation of garbage collection in a Data Domain system, by employing the prefetch technique, performance of the NUMA perfect hash vector operations can be improved by a factor of five, or similar factors.

Backup System Embodiment

Figure 9:
FIG. 9 illustrates a live perfect hash vector for use in PPGC that may use a NUMA-aware PHVEC under an embodiment.

In an embodiment, the NUMA-aware PHVEC is used in a PPGC process 120 to improve the efficiency and reduce the time required to perform garbage collection in network 100. FIG. 9 illustrates a live perfect hash vector for use in PPGC that may use a NUMA-aware PHVEC under an embodiment. For the embodiment of the PPGC system of FIG. 9, the live perfect hash vector 900 replaces the Bloom filters for the Live Vector and the Live Instance Vector in a regular PGC system. The PPGC process is made NUMA-aware through the use of the PHVEC to reduce the cost of remote memory access during enumeration, select and copy phases. To do this, the process creates NUMA affined perfect hash vectors. Fingerprints can be mapped to fixed NUMA domains and all operations can be directed to the assigned NUMA domain in the enumeration, select, and copy phase.

To reduce the per key lookup cost, certain optimizations can be done including:

(1) combining the bucket access and header per bucket into a single cache line to reduce 4 random memory accesses to 3 random memory accesses;

(2) making the perfect hash buckets NUMA-aware, so that there can be a copy of perfect hash buckets per NUMA node;

(3) implementing multi-stride cache prefetching to prefetch all 3 (or 4) memory locations to reduce the latency of lookup (4) making the perfect hash vector NUMA aware so the 3 (or 4) random memory accesses can all go to local NUMA node.

These perfect hash optimizations can be used during select and copy phase, as well.

Figure 10:
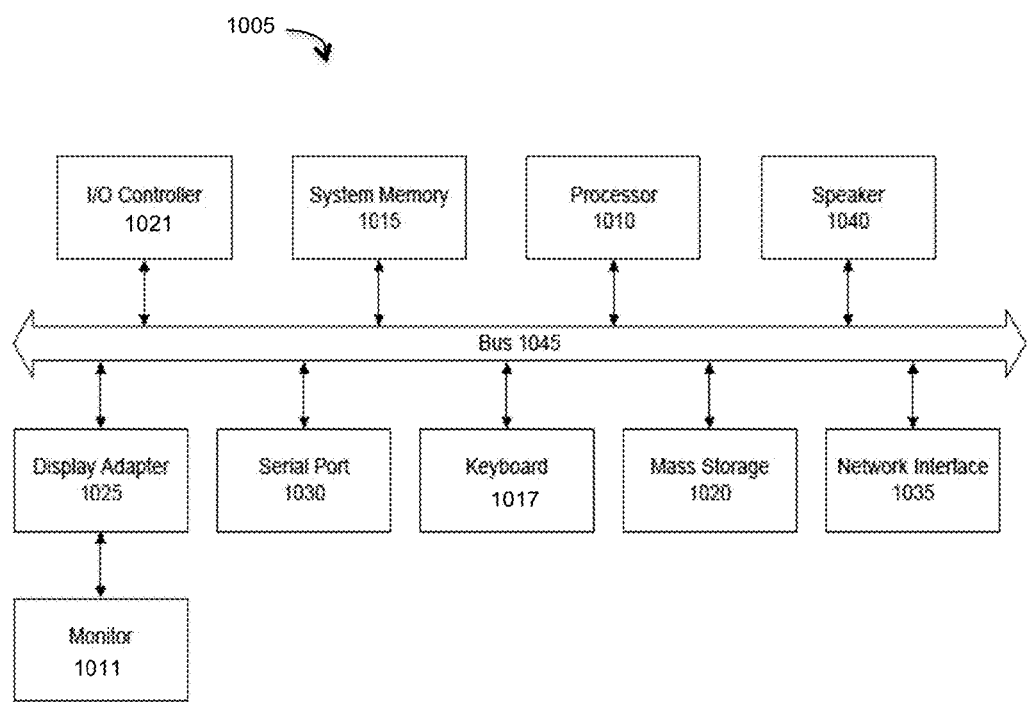
FIG. 10 is a system block diagram of a computer system used to execute one or more software components of the NUMA-Aware PPGC process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
splitting a perfect hash vector (PHVEC) into a number of perfect hash vectors, wherein the number corresponds to a number of nodes having a processing core and associated local memory;
assigning each perfect hash vector of the number of perfect hash vectors to a respective local memory of a node so that each perfect hash vector accesses only the respective local memory; and
assigning fingerprints in each perfect hash vector to a respective node using a mask function.

2. The method of claim 1 wherein the PHVEC is used in a garbage collection process in a deduplication backup system implementing non-uniform memory access (NUMA) processes.

3. The method of claim 1 wherein the fingerprints are partitioned according to the number of NUMA nodes N in the system, and wherein each fingerprint is mapped to the NUMA node in accordance with an equation node=(FP mod N).

4. The method of claim 1 wherein fingerprints are assigned to a particular node using a mapping scheme based on the last two bits of an index (00, 01, 10, 11) created by walking a walk index to create the mask that is combined with the fingerprint.

5. The method of claim 1 wherein the PHVEC is internally subdivided into many smaller vectors denoted buckets, and wherein fingerprints are uniformly hashed into these buckets.

6. The method of claim 5 wherein the PHVEC is created in a single-threaded process wherein fingerprints from an index bucket are hashed into a number of perfect hash buckets based on a stride size of the PHVEC, and wherein the index bucket is read one stride at a time and all the fingerprints are sent to the PHVEC for creation.

7. The method of claim 6 wherein the stride is calculated by first calculating a total number of perfect hash buckets by a total number of fingerprints in the index divided by each perfect hash bucket size, and then dividing the total number of index buckets by the total number of perfect hash buckets.

8. The method of claim 7 wherein the PHVEC is created in a multi-threaded process comprising subdividing the index buckets in stride size units, and wherein at least one bucket is split between two threads to form partial strides, and wherein full strides are processed using the multi-threaded execution and the partial strides are processed using single-threaded execution.

9. The method of claim 1 wherein the PHVEC is used in a perfect physical garbage collection process maintaining a perfect hash live vector in a multi-field data structure including each perfect hash vector, and wherein the PHVEC is split into four perfect hash vectors.

10. The method of claim 9 further comprising combining the bucket access and header per bucket into a single cache line to reduce the four random memory accesses to three random memory accesses.

11. The method of claim 9 further comprising:
creating the PHVEC in a single-threaded process wherein fingerprints from an index bucket are hashed into a number of perfect hash buckets based on a stride size of the PHVEC, and wherein the index bucket is read one stride at a time and all the fingerprints are sent to the PHVEC for creation; and
making the perfect hash buckets NUMA-aware, so that there can be a copy of perfect hash buckets per NUMA node.

12. The method of claim 9 further comprising implementing multi-stride cache prefetching to prefetch all four memory locations to reduce the latency of lookup.

13. A system comprising:
a first component splitting a perfect hash vector (PHVEC) into a number of perfect hash vectors, wherein the number corresponds to a number of nodes having a processing core and associated local memory;
a second component assigning each perfect hash vector of the number of perfect hash vectors to a respective local memory of a node so that each perfect hash vector accesses only the respective local memory; and
a third component assigning fingerprints in each perfect hash vector to a respective node using a mask function.

14. The system of claim 13 wherein the PHVEC is used in a garbage collection process in a deduplication backup system implementing non-uniform memory access (NUMA) processes.

15. The system of claim 14 wherein the fingerprints are partitioned according to the number of NUMA nodes N in the system, and wherein each fingerprint is mapped to the NUMA node in accordance with an equation node=(FP mod N).

16. The system of claim 13 wherein fingerprints are assigned to a particular node using a mapping scheme based on the last two bits of an index (00, 01, 10, 11) created by walking a walk index to create the mask that is combined with the fingerprint.

17. The system of claim 13 wherein the PHVEC is internally subdivided into many smaller vectors denoted buckets, and wherein fingerprints are uniformly hashed into these buckets.

18. A computer program product, comprising a non-transitory computer-readable medium having a computer-readable program code embodied therein, the computer-readable program code adapted to be executed by one or more processors to implement a method comprising:
splitting a perfect hash vector (PHVEC) into a number of perfect hash vectors, wherein the number corresponds to a number of nodes having a processing core and associated local memory;
assigning each perfect hash vector of the number of perfect hash vectors to a respective local memory of a node so that each perfect hash vector accesses only the respective local memory; and
assigning fingerprints in each perfect hash vector to a respective node using a mask function.

19. The computer program product of claim 18 wherein the PHVEC is used in a garbage collection process in a deduplication backup system implementing non-uniform memory access (NUMA) processes.

20. The computer program product of claim 19 wherein the fingerprints are partitioned according to the number of NUMA nodes N in the system, and wherein each fingerprint is mapped to the NUMA node in accordance with an equation node=(FP mod N).

* * * * *